United States Patent [19]

Aoki

[11] Patent Number: 4,883,996
[45] Date of Patent: Nov. 28, 1989

[54] MOTOR

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 195,646

[22] Filed: May 18, 1988

[30] Foreign Application Priority Data

May 22, 1987 [JP] Japan .......................... 62-077046[U]

[51] Int. Cl.$^4$ ............................................. H02K 21/26
[52] U.S. Cl. ..................................... 310/154; 310/91; 310/218; 310/254
[58] Field of Search ............... 310/152, 154, 254, 162, 310/49 R, 257, 179, 40 MM, 218, 233, 261, 155, 46, 89, 91, 114, 258; 354/195.1, 400

[56] References Cited

U.S. PATENT DOCUMENTS

| 1,074,338 | 9/1913 | Ahlm | 310/218 |
| 2,496,831 | 2/1950 | Berg | 310/218 |
| 3,296,471 | 1/1967 | Cochardt | 310/154 U X |
| 4,141,210 | 2/1979 | Flaig | 310/40 MM |
| 4,274,026 | 6/1981 | Haydon et al. | 310/254 |
| 4,394,594 | 7/1983 | Schmider et al. | 310/68 R |
| 4,480,203 | 10/1984 | Takura | 310/49 R |
| 4,629,924 | 12/1986 | Grosjean | 310/257 |

FOREIGN PATENT DOCUMENTS

| 0252274 | 12/1987 | German Democratic Rep. | 310/49 R |
| 0002215 | 10/1980 | Int'l Pat. Institute | 310/154 |
| 0059965 | 4/1985 | Japan | 310/49 R |
| 60-140934 | 9/1985 | Japan . | |
| 60-141682 | 9/1985 | Japan . | |
| 60-184234 | 9/1985 | Japan . | |
| 61-44637 | 3/1986 | Japan . | |
| 0236356 | 10/1986 | Japan | 310/49 R |

Primary Examiner—R. Skudy
Attorney, Agent, or Firm—Fitzpatrick, Cella, Harper & Scinto

[57] ABSTRACT

A motor having a rotary shaft, a coil wound on an iron core fixed to the rotary shaft, a yoke member, a magnetic flux producing member and commutator means has its yoke member constructed with yoke supporting portions serving as a magnetic path of magnetic flux and four magnetic poles having substantially arcuate shape. Each magnetic pole has a largest dimension of thickness at a center portion thereof and extends outwardly with gradually reduced thickness in accordance with the distance from the central portion. Ends of each magnetic pole respectively oppose corresponding ends of the adjacent magnetic poles with a slight distance therebetween, with the magnetic poles surrounding an outer periphery of the iron core. The magnetic flux producing member includes two rectangular parallelepiped blocks. The motor forms a shape approximate to a rectangle or a square by the two blocks and the four poles and supporting portions, wherein a dimension of thickness of the whole motor is set to a value near a dimension of an outer diameter of the iron core.

2 Claims, 4 Drawing Sheets

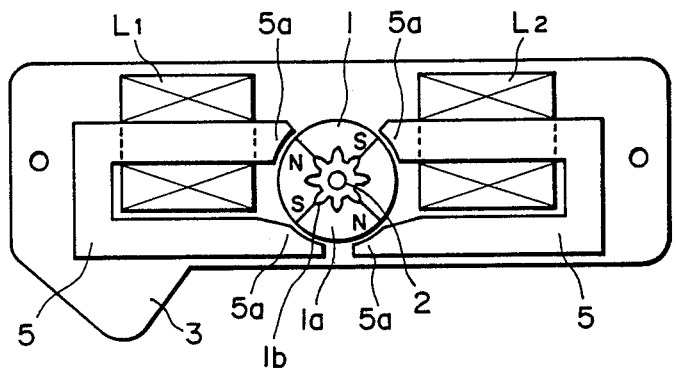
FIG. IA
PRIOR ART
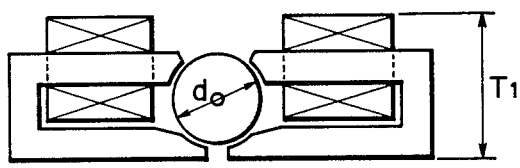
FIG. IB
PRIOR ART
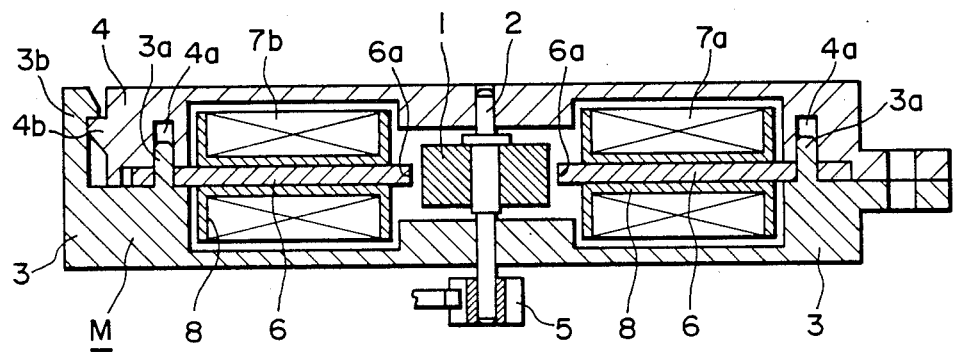
FIG. 2A
PRIOR ART
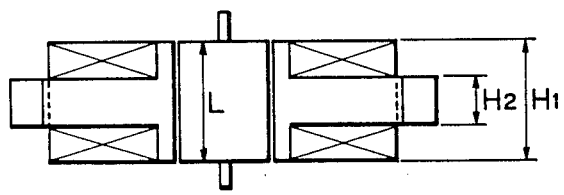
FIG. 2B
PRIOR ART

MOTOR

BACKGROUND OF THE INVENTION

1. Field of the Invention

This invention relates to a motor formed in a rectangular or square shape.

2. Related Background Art

FIG. 1A of the accompanying drawings shows the construction of the essential portions of a motor disclosed in Japanese Laid-Open Utility Model Application No. 61-44637 and Japanese Laid-Open Utility Model Application No. 60-140934. A rotor 1 has a cylindrical rotor portion 1a with four poles on the circumference thereof, and a pinion 1b for outputting the rotation of said rotor 1 to a subsequent ring train, The rotor 1 is unitarily formed of a mixed synthetic resin material having magnetic powder mixed therewith. The poles of said rotor portion 1a and the teeth of said pinion 1b form a phase angle $\theta$. A rotor shaft 2 is integrally secured to the central portion of the rotor. One end of said rotor shaft 2 is rotatably supported by a hole in a lower plate 3, and the other end of said rotor shaft 2 is rotatably supported by a hole in an upper plate 4 (not illustrated in FIG. 1A—see FIG. 2A). Each of stators 5 has a pair of legs so as to form a U-shape, and each end of the legs has a magnetic pole portion 5a opposed to the pole on the circumference of said rotor portion 1a, and the stators are so disposed that the ends thereof which are of the same shape are opposed to each other on the same plane, and are supported by the lower plate 3 and the upper plate 4. Two coils L1 and L2 for causing each magnetic pole portion 5a of said stator to produce a magnetic field, are connected to a driving circuit, not shown, and are inserted in the legs of said stator 5. The rotor 1, the rotor shaft 2, the lower plate 3, the upper plate 4, the stator 5 and the coils L1 and L2 together constitute a conventional PM type step motor M.

FIG. 2A of the accompanying drawings shows another motor of conventional construction disclosed in Japanese Laid-Open Utility Model Application No. 60-141682.

Referring to FIG. 2A, a rotor 1 comprising a permanent magnet magnetized with four poles in the diametrical direction thereof is integrally secured to a rotor shaft 2. One end of the rotor shaft 2 is rotatably supported by a hole in a lower plate 3, and the other end of the rotor shaft 2 is rotatably supported by a hole in an upper plate 4. Said one end of the rotor shaft 2 extends through the hole in the lower plate 3 and has secured thereto a coupling 5 for transmitting the rotation of the rotor 1 to a gear train. A stator 6 has a pair of legs so as to form a U-shape, and each end portion of those legs has a magnetic pole portion 6a opposed to the outer periphery of the rotor 1. Each magnetic pole portion 6a is formed so that the angle o thereof with respect to the center of the rotor is in a 90° phase relation. There are provided two such stators 6 on the same plane and moreover, the magnetic pole portions 6a of one of the stators are disposed close to each other, and the phase relation between the magnetic pole portions 6a disposed close to each other is such that the angle $\beta$ thereof with respect to the center of the rotor 1 is 45°, and the stators are positioned by guide pins 3a provided on the lower plate 3. Further, two coils 7a and 7b for causing the magnetic pole portions 6a of the stators to produce a magnetic field are connected to a driving circuit (not shown), and said coils 7a and 7b are wound on coil frames 8, respectively, and are inserted in the legs of the stators 6 on that side thereof which does not have the magnetic pole portions 6a disposed close to each other. On the other hand, the lower plate 3 nd the upper plate 4 are formed by plastic molding, and the lower plate 3 has a restraining pawl 3b for mounting and fixing the upper plate 4, and the upper plate 4 has guide slots 4a into which the guide pins 3a of the lower plate fit, and a hooking portion 4b engageable with the restraining pawl 3b. After the two stators 6 into which the coils 7a and 7b have been inserted and the rotor 1 are mounted on the lower plate 3, the upper plate 4 is placed on the lower plate from above and the restraining pawl 3b and the hooking portion 4b are brought into engagement with each other, whereby the lower plate 3, the upper plate 4 and the stators 6 are fixed and the rotor 1 is rotatably supported.

FIGS. 1B and 2B of the accompanying drawings schematically show the arrangement relation between the rotors and the stators of the motors shown in FIGS. 1A and 2A, respectively.

Problems peculiar to the prior art will be mentioned below.

In the motors shown in FIGS. 1A and 2A, as shown in FIGS. 1B and 2B, the motor height $T_1$ is great relative to the rotor diameter d, and the yoke width $H_2$ is small relative to the rotor length L and thus, the magnetic flux cannot be designed to be great.

The cross-sections of the yokes are not identical in width to each other, such as $H_1$ and $H_2$, and this leads to a great number of working steps and a high cost.

The cross-sections of the yokes are not identical in width to each other, such as $H_1$ and $H_2$, and a clearance magnetic flux density of uniform intensity is not provided for the rotor length L, and if an attempt is made to make the magnetic flux density uniform, it is necessary that $H_2 = L$, and $H_1$ must be made greater.

SUMMARY OF THE INVENTION

It is the object of the present invention to provide a motor formed in a rectangular or square shape with a rotor surrounded by two block-like magnetic flux producing members and four yoke members.

BRIEF DESCRIPTION OF THE DRAWINGS

FIGS. 1A and 2A show the construction of motors according to the prior art.

FIGS. 1B and 2B schematically show the relations between the rotor and yokes of the motors shown in FIGS. 1A and 2A.

DESCRIPTION OF THE PREFERRED EMBODIMENTS

Figure 3A:
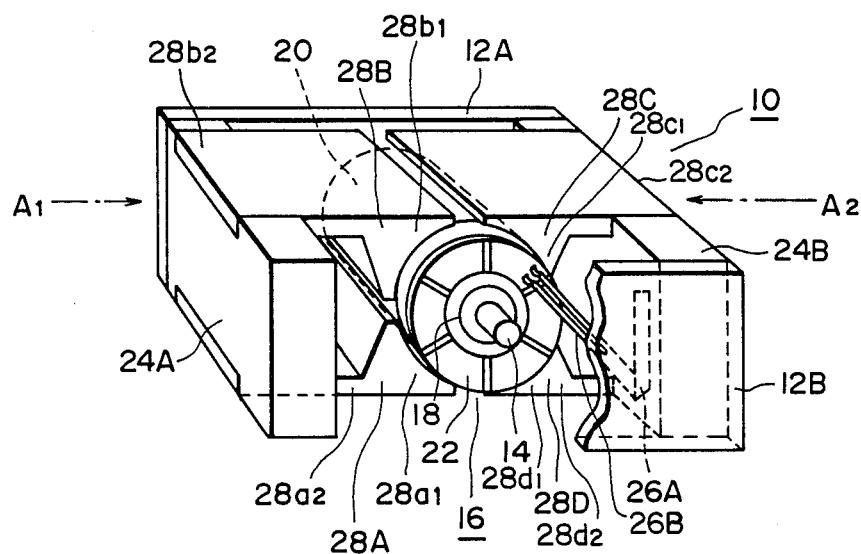
FIGS. 3A, 3B, 3C and 3D show an embodiment of the present invention, FIG. 3A being a partly broken-away perspective view of essential portions, FIG. 3B being a cross-sectional view taken along the line $A_1-A_2$ of FIG. 3A, FIG. 3C being a front view in which the side plate 12B of FIG. 3A has been removed, and FIG. 3D being a plan view corresponding to FIG. 3A.
Figure 3B:
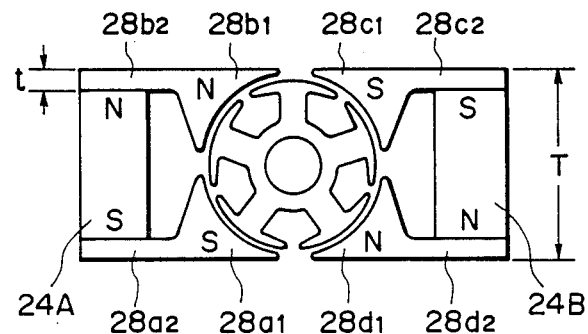

FIG. 3A is a perspective view showing the essential portions of a motor according to the present invention, and FIG. 3B is a cross-sectional view taken along the line $A_1$–$A_2$ of FIG. 3A. In these figures, the reference numeral 10 generally designates a motor, and the reference characters 12A and 12B denote side plates serving also as a motor case. The side plates 12A and 12B are rectangular and are provided with bearings 14A and 14B (see FIG. 3D) at the center thereof for supporting a rotary shaft 14. The reference numeral 16 designates a rotor which comprises an iron core 18 fixed to the rotary shaft 14, a field coil 20 wound on the iron core 18, and a commutator 22 for supplying electric power to the coil 20. The reference characters 24A and 24B denote magnetic flux producing members such as permanent magnets. Each of the magnetic flux producing members 24A and 24B is formed into a rectangular parallelopiped or planar block and has a north pole and a south pole at the opposite ends in the lengthwise direction thereof, i.e., the vertical direction.

Figure 3C:
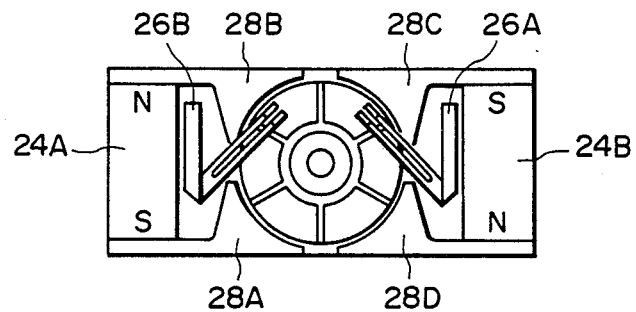
Figure 3D:
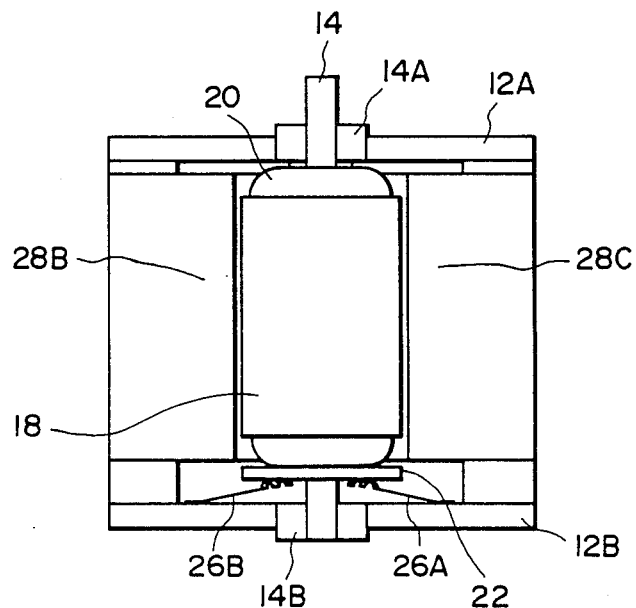

Each segment of the commutator 22 is connected to the coil wound on the iron core, and brushes 26A and 26B are urged against the commutator as shown in FIGS. 3C and 3D One end of each of the brushes 26A and 26B is fixed to the side plate 12B and the other end of each of said brushes is connected to a motor driving circuit, not shown, by an electric cable, not shown.

The reference characters 28A, 28B, 28C and 28D designate yoke members which comprise magnetic pole portions $28a_1$, $28b_1$, $28c_1$ keeping a minute clearance on the outer periphery of the coil of the rotor and having substantially arcuate opposed surfaces along the circumferential direction of the coil, and planar yoke supporting portions $28a_2$, $28b_2$, $28c_2$, $28d_2$ extending from said magnetic pole portions, the ends of said yoke supporting portions being fixed to the opposite ends of said blocks 24A and 24B. The magnetic pole portions $28a_1$, $28b_1$, $28c_1$, $28d_1$ of said yoke members extend so that the central portions thereof are greatest in thickness and the thickness t becomes smaller from the center toward the marginal portion, and the extending end of the magnetic pole portion of each yoke faces the extending end of the adjacent magnetic pole portion with a slight spacing therebetween so as to surround the outer periphery of the rotor.

As shown in FIG. 3B, the field structure of the motor of the present invention comprising the rotor 16, the magnetic flux producing members 24A, 24B and the yoke members 28A, 28B, 28C, 28D forms a rectangular shape by the two magnetic flux producing members 24A, 24B and the four yoke members.

The thickness T of the entire motor is set to a value approximate to the outer diameter of the rotor 16.

That is, in the structure of the embodiment of FIGS. 3A and 3B, the sizes of the magnetic flux producing members 24A and 24B can be selected to sufficiently great volumes independently of the thickness T of the motor in the lengthwise direction of the rectangle, and accordingly, the thickness T of the motor can be reduced to substantially the same value as the outer diameter of the rotor 16 independently of the sizes (volumes) of the magnetic flux producing members which affect the output of the motor.

Figure 4:
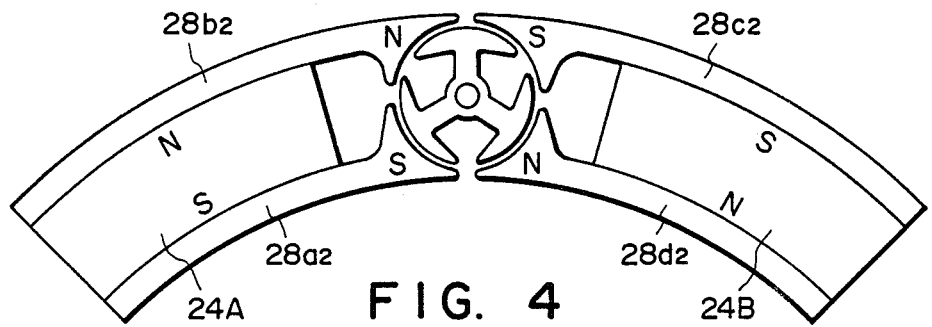
FIG. 4 shows an embodiment in which the yoke members and the magnet of the magnetic flux producing member in the motor of the construction shown in FIGS. 3A-3D are made arcuate and the entire motor is formed in an arcuate shape.

FIG. 4 is a front view showing the field structure of a DC motor according to another embodiment of the present invention.

The present embodiment is made into an arcuate shape suitable for being compactly incorporated into an annular space such as the interior of the barrel of a camera lens, and is substantially of the same structure as the aforedescribed embodiment of FIG. 3 with the exception that the yoke members and the magnetic flux producing members held therebetween are arcuately shaped as shown.

Accordingly, in the embodiment of FIG. 4, portions corresponding to those of FIGS. 3A–3D are given identical reference numerals and need not be described in detail.

Figure 5:
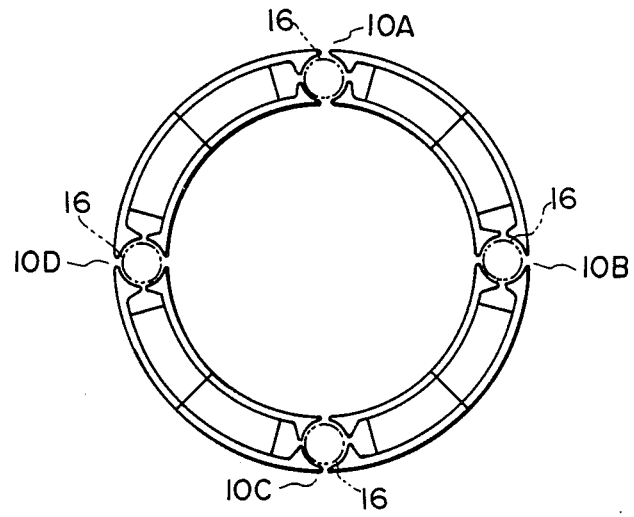
FIG. 5 is a front view of a hollow annular compound motor constructed by using a plurality of such motors 10A-10D as shown in FIGS. 3A-3D.

FIG. 5 shows a case where four sets of arcuate motors 10A, 10B, 10C and 10D such as the motor shown in FIG. 4 are used to construct a hollow annular motor.

That is, the motor of FIG. 5 is such that the motor of the FIG. 4 structure is made into an arcuate shape having a center angle of about 90° and four such motors are disposed on the circumference to constitute an annular motor assembly (a compound motor) having a desired diameter.

In the motor assembly of FIG. 5, the respective output shafts from four rotors 16 are connected for power transmission by gears, timing belts or the like and the outputs from the respective motors are combined for use as the power source of an apparatus, for example, an automatic focus driving apparatus incorporated in the barrel of a camera lens.

According to the compound motor of FIG. 5, there can be provided a motor unit in which the annular space such as the interior of the lens barrel of a camera can be effectively utilized to minimize the outer diameter of the motor as compared with the magnitude of the output thereof.

Figure 6:
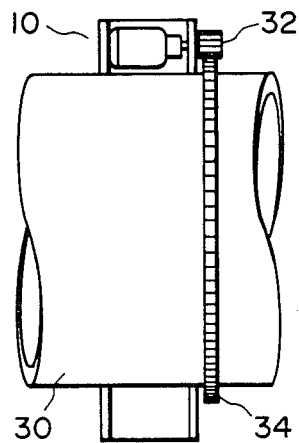
FIG. 6 is a side view showing the motor of FIGS. 3A-3D as it is used in the lens barrel of a camera.

FIG. 6 illustratively shows a case where the arcuate DC motor of FIG. 5 is disposed on the outer periphery of the lens barrel of a camera to drive an auto focus apparatus.

In FIG. 6, the motor shown in FIGS. 3A–3D or 4 is mounted on the outer periphery of a lens barrel 30 and a pinion 32 mounted on the output shaft of said motor meshes with a ring gear 34 provided on the outer periphery of the lens barrel 30.

On the other hand, the lens barrel 30 is engaged with a barrel frame (not shown) on the fixed side, for example, through a spiral slot (not shown).

Thus, by rotating the lens barrel 30 by a predetermined angle by said arcuate motor through the pinion 32 and the ring gear 34, the lens barrel 30 can be moved back and forth in the direction of the optic axis of the lens relative to the camera body, whereby focusing of the lens system can be accomplished.

According to the structure of the above described DC motor according to the present embodiment, the thickness of the motor can be made approximate to the diameter of the rotor 16 and the space occupied by the permanent magnets can be secured greatly and therefore, there can be provided a DC motor which is small in thickness but great enough in output as compared with the motor of conventional structure and which is suitable for incorporation into the small gap of an instrument.

Particularly, the arcuate yoke members makes the motor advantageous for incorporation into an annular space such as the interior of the lens barrel of a camera and moreover, by connecting a plurality of motors to thereby construct a hollow annular compound motor, there can be achieved the effect that a narrow gap can be utilized to mount a powerful power source therein.

When a motor was actually manufactured, if for example, the thickness of the motor was 5 to 7 mm, the diameter of the rotor 16 was 2 to 3 mm in the prior-art structure of FIG. 1A and it was very difficult to manufacture the motor, and even if it was manufactured, the volume of the field magnets was small and the necessary output could not be obtained.

According to the present invention, a motor having a thickness of 5–6 mm approximate to the diameter of the rotor 16 can be easily designed and the volume space for the field magnets can be secured sufficiently and thus, a thin and powerful motor can be easily manufactured.

Also, according to the present invention, the field structure comprises four poles and therefore, there can be provided a motor which, as compared with a two-pole motor, has an output characteristic suitable for auto focus (AF) drive of a lens which requires a low speed and a high torque.

As described above, according to the construction of the present embodiment, the motor height T for the rotor diameter d can be made nearly equal to T.

The yoke width and the magnet width can be made substantially equal to the rotor length L, and the magnetic flux can be designed to be great.

The cross-sections of the yokes are identical to each other and therefore, the yokes can be formed as by layering punched thin iron sheets, and this leads to a reduced number of working steps and a lower cost. Also, the trial manufacture of a single motor for the evaluation of the performance thereof does not require the motor to be made arcuate and therefore, in such case, only one find of yokes may be prepared. (Two kinds of yokes must be prepared when the motor is formed into a formal arcuate shape.)

When designing motors of various outputs, the amount of magnetic flux of the magnet used and the thickness t of the yoke portion required therefor can be optimally designed in the thickness T of the whole.

I claim:

1. A motor having a rotary shaft, a coil wound on an iron core fixed to said rotary shaft, a yoke member, a magnetic flux producing member for magnetizing said yoke member, and commutator means for supplying electric power to said coil, said yoke member comprising yoke supporting portions serving as a magnetic path of magnetic flux, and four magnetic poles having substantially arcuate shapes and extending from said yoke supporting portions, each magnetic pole having a largest dimension of thickness at a center portion of the magnetic pole, and extending from the center portion toward ends thereof with a gradually reduced dimension of thickness in accordance with a distance from the central portion, the ends of each magnetic pole respectively opposing corresponding ends of adjacent magnetic poles with a slight distance therebetween, said magnetic poles surrounding an outer periphery of said iron core;

said magnetic flux producing member comprising two rectangular parallelepiped blocks, each of said blocks having a north pole and a south pole at the opposite ends thereof, each of said supporting portions being connected and fixed to a respective magnetic pole of each of said blocks;

said motor forming a shape approximate to a rectangle or a square by said two blocks and said four poles and supporting portions, wherein a dimension of thickness of the whole motor is set to a value near a dimension of an outer diameter of said iron core.

2. A motor according to claim 1, wherein the supporting portions of said yoke member are arcuate and the motor as a whole forms an arcuate shape.

* * * * *

UNITED STATES PATENT AND TRADEMARK OFFICE
CERTIFICATE OF CORRECTION

PATENT NO. : 4,883,996

DATED : November 28, 1989

INVENTOR(S) : KANEMASA AOKI

It is certified that error appears in the above-identified patent and that said Letters Patent is hereby corrected as shown below:

ON THE TITLE PAGE, IN ITEM [56] REFERENCES CITED:

U.S. Patent Dcouments, "Berg" should read --van den Berg--.

COLUMN 1

Line 16, "train," should read --train.--.
    Line 56, "angle o" should read --angle $\alpha$--.

COLUMN 2

Line 4, "nd" should read --and--.

COLUMN 4

Line 8, "FIG. 3" should read --FIGS. 3A-3D--.
    Line 53, "optic axis" should read --optical axis--.
    Line 56, "above described" should read --above-described--.
    Line 66, "makes" should read --make--.

UNITED STATES PATENT AND TRADEMARK OFFICE
CERTIFICATE OF CORRECTION

PATENT NO. : 4,883,996
DATED : November 28, 1989
INVENTOR(S) : KANEMASA AOKI

It is certified that error appears in the above-identified patent and that said Letters Patent is hereby corrected as shown below:

COLUMN 5

Line 26, "T" should read --d--.
    Line 38, "find" should read --kind--.

Signed and Sealed this

Fifth Day of May, 1992

Attest:

DOUGLAS B. COMER

*Attesting Officer*    *Acting Commissioner of Patents and Trademarks*